US007900147B2

(12) United States Patent
Lei et al.

(10) Patent No.: US 7,900,147 B2
(45) Date of Patent: Mar. 1, 2011

(54) SYSTEM AND METHOD FOR ENABLING DISCONNECTED WEB ACCESS

(75) Inventors: Hui Lei, Scarsdale, NY (US); Yiming Ye, White Plains, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 2055 days.

(21) Appl. No.: 10/201,367

(22) Filed: Jul. 22, 2002

(65) Prior Publication Data

US 2004/0012625 A1     Jan. 22, 2004

(51) Int. Cl.
    *G06F 3/00*     (2006.01)
(52) U.S. Cl. .......................................... 715/747; 715/744
(58) Field of Classification Search .................. 715/744, 715/745, 746, 747
    See application file for complete search history.

(56) References Cited

U.S. PATENT DOCUMENTS

| | | | | |
|---|---|---|---|---|
| 5,826,031 A | | 10/1998 | Nielsen | 709/233 |
| 5,961,602 A | * | 10/1999 | Thompson et al. | 709/229 |
| 5,978,847 A | * | 11/1999 | Kisor et al. | 709/227 |
| 6,055,572 A | * | 4/2000 | Saksena | 709/224 |
| 6,144,964 A | * | 11/2000 | Breese et al. | 707/10 |
| 6,493,758 B1 | * | 12/2002 | McLain | 709/227 |
| 6,742,033 B1 | * | 5/2004 | Smith et al. | 709/224 |
| 6,904,560 B1 | * | 6/2005 | Panda | 715/500 |
| 2002/0065802 A1 | * | 5/2002 | Uchiyama | 707/1 |
| 2003/0055762 A1 | * | 3/2003 | Holt | 705/36 |
| 2003/0126232 A1 | * | 7/2003 | Mogul et al. | 709/219 |
| 2003/0195940 A1 | * | 10/2003 | Basu et al. | 709/213 |

OTHER PUBLICATIONS

Pazzani, michael, Syskill & Webert: Identifying interesting web sites, May 2, 1997, pp. 1-17.*
V.N. Padmanabhan and J.C. Mogul, "Using Predictive Prefetching to Improve World Wide Web Latency", Computer Communications Review, 26(3):22-36, Jul. 1996.
D. Duchamp, "Prefetching Hyperlinks", Proceedings of Second USENIX Symposium on Internet Technologies and Systems, USENIX, Boulder. CO., pp. 127-138, 1999.
H. Lieberman, "Letizia: An Agent That Assists Web Browsing", Proceedings of International Joint Conference on Artificial Intelligence, Montreal, Canada, Aug. 1995.
D. Mladenic, "Personal WebWatcher: Design and Implementation", Technical Report IJS-DP-7472, Department for Intellifent System s, J. Stefan Institute, Slovenia, 1998.

(Continued)

*Primary Examiner* — Ryan F Pitaro
(74) *Attorney, Agent, or Firm* — Scully, Scott, Murphy & Presser, P.C.; Preston J. Young, Esq.

(57) ABSTRACT

A system and method for supporting offline Web browsing. A user interests profile comprising content and attribute preferences of Web pages the user may be interested in is provided. Based on that user's profile, there is generated an interestingness values value for each of candidate Web pages. From a hoard request initiated by a user, received one or more Web pages are selected and downloaded based on their respective interestingness values. These Web pages are stored for later viewing by the user when offline. The candidate Web pages include base Web pages which are supplied by the user in the hoard request, and linked Web pages which are reachable from the base pages. Thus, an interestingness value may be computed as the interestingness of a hyperlink associated with a Web page reachable from a base Web page, the interestingness value of a hyperlink being based upon the similarity of a linked Web page to the base Web page and/or to that user's interests profile.

31 Claims, 4 Drawing Sheets

OTHER PUBLICATIONS

D. Mladenic, "Machine Learning on Non-Homogeneous, Distributed Text Data", Doctoral Dissertation, Faculty of computer and Information Science, University of Ljubljana, Slovenia, 1998.

Mohan, Smith and Li, "Adapting Multimedia Internet Content for Universal Access," IEEE Transactions of Multimedia, 1(1):104-114, 1999.

S. Paek and J.R. Smith, "Detecting Image Purpose in World Wide Web Documents", Proceedings of IS&T/SPIE Symposium on Electronic Imaging: Science and Technology-Document Recognition, San Jose, CA, Jan. 1998.

* cited by examiner

1065

| Feature | Weight |
|---|---|
| Sports | 0.80 |
| Baseball | 0.90 |
| Stocks | 0.75 |
| ...... | |
| ...... | |

1063 → 　　　　　　← 1068

Content Feature Vector

| Feature | Weight |
|---|---|
| http://www.nytimes.com/pages | 0.50 |
| http://www.nytimes.com/pages/sports/ | 0.85 |
| http://www.nytimes.com/pages/business/ | 0.70 |
| ...... | |
| ...... | |

1073 → 　　　　　　← 1078

Attributes Feature Vector

Figure 2(b)

SYSTEM AND METHOD FOR ENABLING DISCONNECTED WEB ACCESS

BACKGROUND OF THE INVENTION

1. Field of the Invention

The present invention generally relates to the information access over the World Wide Web ("WWW"), and to an improved method and apparatus for enabling off-line web access, i.e., while disconnected from the Internet.

2. Description of the Prior Art

The World Wide Web (WWW or Web) is a network application that employs the client/server model to deliver information on the Internet to users. A Web server disseminates information in the form of Web pages. Web clients and Web servers communicate with each other via the standard Hypertext Transfer Protocol (HTTP). A (Web) browser is a client program that requests a Web page from a Web server and graphically displays its contents. Each Web page is associated with a special identifier, called a Uniform Resource Locator (URL), that uniquely specifies its location. Most Web pages are written in a standard format called Hypertext Markup Language (HTML). An HTML document is simply a text file that is divided into blocks of text called elements. These elements may contain plain text, multimedia content such as images, sound, and video clips, and even other elements. An important type of element, called anchor elements, enables a Web page to embed hyperlinks, i.e., links to other Web pages. A Web browser typically displays hyperlinks in a distinctive format: as underlined text, or in a different color. When a user clicks a link, the browser brings up the page referenced by that link, even if it is on a different server. The Web page containing a hyperlink is referred to as the source document. The page referenced by a hyperlink is known as the target document.

A useful mode of web browsing is disconnected web access, otherwise known as offline browsing, which permits a user to view web pages while he/she is disconnected from the Internet. Disconnected web access is needed when there is no networking capability available at the location of a (mobile) computer, or when the user wants to avoid use of the network to reduce network charges and/or to extend battery life. It is also a viable fallback position when network characteristics degrade beyond usability. Disconnected web access works by storing (hoarding) necessary Web pages on the hard disk of the client computer prior to disconnection and, disconnected, servicing user requests for Web pages with the local copies. To maximize content availability, the user often needs to explicitly specify a set of Web pages that he is likely to access. Before going offline, these specified Web pages, called base pages, are downloaded to the client computer, along with some other pages that are reachable by following hyperlinks from the base pages. It is not sufficient to hoard base pages only because the user typically does not stop at a base page: while offline, he may request a page that is several clicks away from a base page.

Conceptually, a base page and all the pages that can be reached from it form a tree whose edges correspond to hyperlinks: the root is the base page, the second-level tree nodes are the pages one click away from the base page, the third-level nodes are the pages two clicks away from the base page, et al. The size of such a tree is often excessively large, due to the dense interconnection of Web pages. Hoarding all the pages in the tree would require a prohibitively long time and a disk space far beyond the local disk's capacity. Therefore, only a small subset of those pages may be hoarded. Existing systems, such as Microsoft's Internet Explorer, limit hoarded pages to those that are within a certain number of links from the base page. They are effectively based on a breadth-first approach, giving the pages at the same level equal consideration. However, a user's browsing behavior typically follows a depth-first pattern and not all links are of equal importance to the user. This implies that existing systems either waste significant time and space hoarding Web pages that are not needed by the user, or leave a lot of necessary pages unavailable to the user while offline. Some existing systems allow a user to refine the selection of pages based on a page's attributes such as its file type and whether it is on the same server (or in the same directory) as the base page. However, these options alone are not sufficient to limit the hoard volume. They must be combined with the hoard-by-level approach and therefore, do not ameriolate the problem. Since it is inconvenient or even impossible for a user to explicitly specify all the Web pages he will possibly access offline, a method is needed that hoards Web pages in anticipation of the user's future requirements so that the limited resources of time and disk space can be devoted to hoarding the Web pages that are most likely to be needed by the user offline.

As is known in the art, one can try to model a user's interests and/or to predict a user's future needs based on the user's past behavior. For example, by observing users' past Web usage, a system can build a data structure that reflects the interrelationship between URL references. The system is then able to speculate, given a URL reference (i.e., an access to a Web page), what other URLs are likely to be referenced in the near future. The system can further prefetch the corresponding Web pages before the user actually demands them, reducing user-perceived access latency. One such technique is described by V. N. Padmanabhan and J. C. Mogul in an article entitled *Using Predictive Prefetching to Improve World Wide Web Latency, Computer Communications Review*, 26(3):22-36, July 1996. They construct a dependency graph which has a node for every URL that has been referenced. Correlation between URLs are captured by edges through the nodes weighted by the likelihood that one will be referenced soon after the other. D. Duchamp discusses a similar technique in *Prefetching Hyperlinks, Proceedings of Second USENIX Symposium on Internet Technologies and Systems*, Pages 127-138, USENIX, Boulder, Colo. His system prefetches hyperlinks embedded in a Web page based on a usage profile that indicates how often those links have been previously accessed relative to the embedding page. These prefetching techniques are designed to improve Web access performance in a connected environment and are not suitable for Web hoarding which aims at optimizing data availability during disconnection. Specifically, they can predict only the pages that have been previously referenced, severely limiting the demand references that can benefit from the techniques. In order to make a substantial number of useful predictions, they often rely on observing a plurality of users, as opposed to a single user. That potentially increases the number of false predictions at the same time and the wasteful consumption of precious resources thereof.

Instead of using URL references to model user behavior, an alternative is to observe the document content seen by users. Appropriately aggregating the content of the Web documents that a user has browsed over time will give a pretty accurate indication of the user's interests. Such learned model of user interests can be used for assisting the user browsing the Web, suggesting hyperlinks that are potentially interesting to the user. Two systems of this kind are described by H. Lieberman in *Letizia: An Agent That Assists Web Browsing, Proceedings of International Joint Conference on Artificial Intelligence*, Montreal, Canada, August 1995, and by D. Mladenic in *Per-* sonal WebWatcher: Design and Implementation, Technical Report IJS-DP-7472, Department for Intelligent Systems, J. Stefan Institute, Slovenia, respectively. Again these systems are targeted at a connected environment and have no pressing need to identify interesting hyperlinks to the fullest extent possible. They emphasize the actual interestingness of a hyperlink (i.e., the interestingness of the target document), instead of the perceived interestingness of the hyperlink (i.e., how interesting the link appears to the user in the context of the embedding page). Further, they consider the user's historical and persistent interests only and not the user's current, and possibly new, interests.

Although the content of a document says much about its reader's interests, so do other attributes associated with the document. In particular, the URL of a document describes the location of the document in terms of the server and the directory path on the server. The composition of a URL is potentially very useful because it reflects the hierarchical clustering of documents. Consider the following hypothetical usage pattern: a user frequently browses documents in the sports directory of one newspaper's Web site; but he seldom reads documents in the finance directory on the same Web site or sports documents on another newspaper's site. Chances are the user is very interested in the first newspaper's sports articles; more so than in the same newspaper's finance articles or the second newspaper's sports articles. Note how inferences can be made here regarding the user's interests without knowing the exact content of those articles.

As is also known in the art, it is possible to compare the relatedness, or similarity, of two entities with respect to certain properties of the entities. First, each entity is represented by a feature vector, where the elements of the vector are features characterizing the entity and each element has a weight to reflect its importance in the representation of the entity. Next, the relatedness of the two entities are computed as the distance between the two corresponding feature vectors. Such a technique is commonly used in text retrieval systems based on a comparison of content features (words and phrases) extracted from the text of documents and queries. The specifics of the feature selection procedures, feature weighting schemes, and similarity metrics are generally known to those of ordinary skill in the art. Feature selection and weighting techniques tailored for HTML content are described by D. Mladenic in *Machine Learning on Non-Homogeneous. Distributed Text Data*, Doctoral Dissertation, Faculty of Computer and Information Science, University of Ljubljana, Slovenia, 1998.

Accordingly, a need exists for a method for enabling a user's disconnected Web access that overcomes the deficiencies of the prior art. This method should hoard Web pages in the descending order of user-perceived interestingness, preferably considering the user's preferences on both document content and attributes.

SUMMARY OF THE INVENTION

It is an object of the present invention to provide a system and method for supporting disconnected Web access, where a user specifies a collection of base URLs that are likely to be needed while disconnected and prompts the computing system to hoard necessary Web pages on the client computer prior to going offline.

It is another object of the present invention to provide a method for hoarding Web pages in preparation for offline browsing, based on the perceived interestingness of the pages.

A further object of the present invention is to provide a method of determining the interestingness of Web pages as perceived by a user, without requiring explicit user specification of the interestingness for all possible pages.

A further object of the present invention is to provide a method of modeling a user's interests in Web page documents which considers both the document content and/or the attributes associated with the document such as the composition of the URL.

According to the principles of the invention, there is provided a system and method for supporting offline Web browsing. A user interests profile comprising content and attribute preferences of candidate Web pages the user may be interested in is provided. Based on that user's profile, there is generated an interestingness values for each of candidate Web pages. From a hoard request received one or more Web pages are selected and downloaded based on their respective interestingness values. These Web pages are stored for later viewing by the user when offline. The candidate Web pages include base Web pages which are supplied by the user in the hoard request, and linked Web pages which are reachable from the base pages. Thus, an interestingness value may be computed as the interestingness of a hyperlink associated with a Web page reachable from a base Web page, the interestingness value of a hyperlink being based upon the similarity of a linked Web page to the base Web page and/or to the user's interests profile.

BRIEF DESCRIPTION OF THE DRAWINGS

Further features, aspects and advantages of the apparatus and methods of the present invention will become better understood with regard to the following description, appended claims, and the accompanying drawings where:

FIGS. 2(*a*) and 2(*b*) depict exemplary interests profile with a content features vector shown in FIG. 2(*a*) and an attribute features vector shown in. FIG. 2(*b*).

DETAILED DESCRIPTION OF PREFERRED EMBODIMENTS

Figure 1:
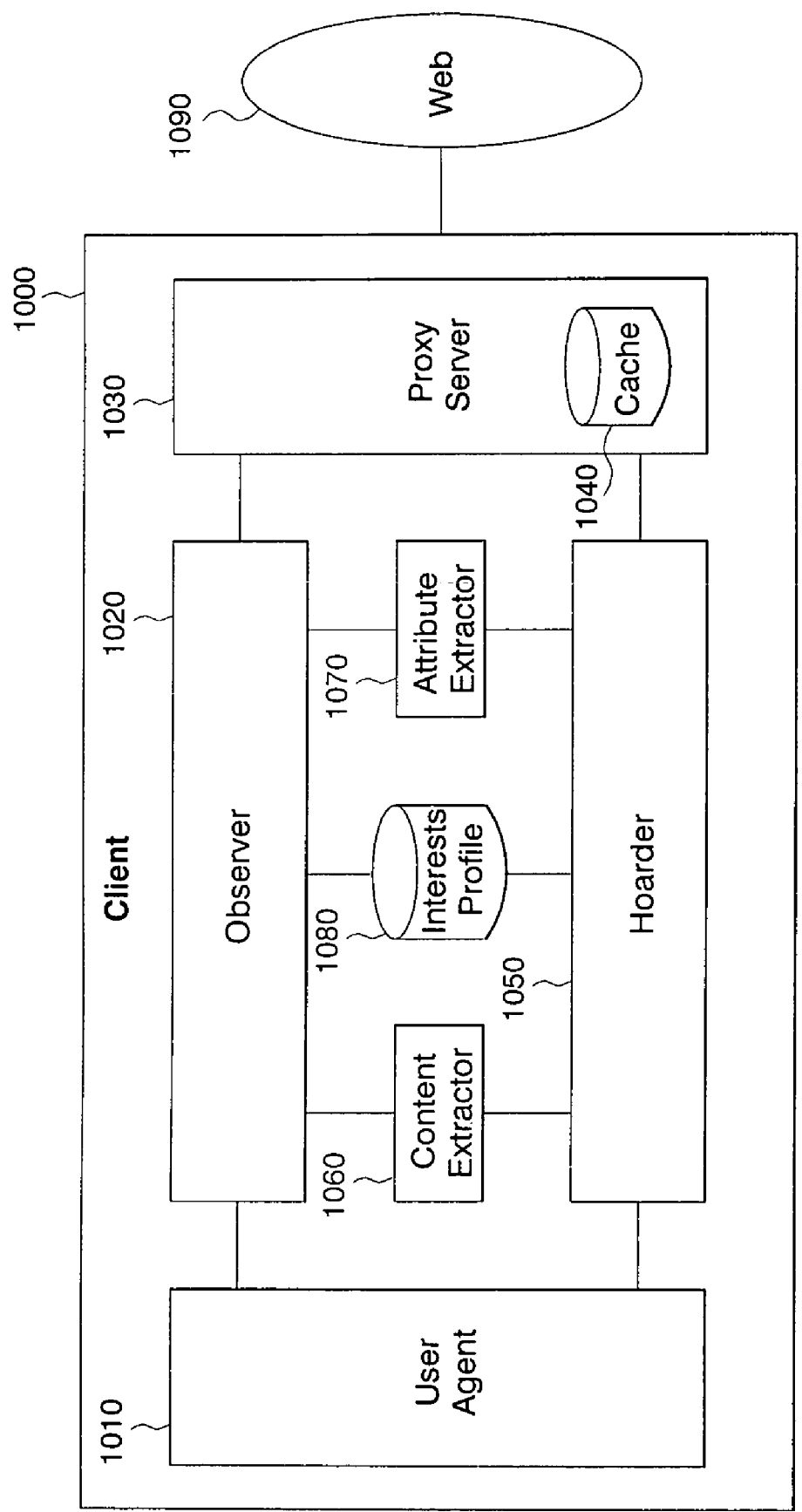
FIG. 1 is a block diagram of an overall system architecture in which the present invention can operate, formed in accordance with one embodiment of the present invention.

The present invention may be more fully understood with reference to FIG. 1, which shows an overall system architecture in which a preferred embodiment of the invention can operate. The components of FIG. 1 includes a client system 1000 and the World-Wide-Web 1090, which includes a collection of Web servers (not shown). The client system 1000 preferably includes a user agent 1010 operatively coupled to both an observer 1020 and a hoarder 1050. The observer 1020 and the hoarder 1050 in turn are operatively coupled with a content extractor 1060, an attribute extractor 1070, an interests profile 1080, and a proxy server 1030. The proxy server 1030, which is shown to have a cache memory storage 1040, is enabled to communicate with the Web 1090. It is to be appreciated that the component associations described above with respect to FIG. 1 are for illustrative purposes. The components may be readily reconfigured, including moving some of the components in the client system 1000 to another computer. Given the teachings of the present invention provided herein, and the teachings of commonly-owned, co-pending U.S. patent application Ser. No. 10/201,420 entitled SYSTEM AND METHOD FOR SORTING EMBEDDED CONTENT IN WEB PAGES, the contents and disclosure of which is incorporated by reference as if fully set forth herein, one of ordinary skill in the related art will contemplate these and various other configurations.

The user agent 1010 serves as the interface between a human user and the computing system. The user agent 1010 accepts commands from the user. A user command may comprise a demand request for accessing a Web page, or a hoard request for downloading a plurality of base Web pages and a subset of the pages that are reachable from the base pages. The user agent 1010 passes demand requests to the observer 1020, and hoard requests to the hoarder 1050. The user agent 1010 also presents to the user responses from the computer system, including the Web pages the user has demanded. It is to be appreciated that a hoard request may be issued in two separate steps: first, the URLs for the base Web pages are specified; next, a hoard command is issued to start the actual hoarding process. In such a case, the user agent 1010 saves the user-specified base URLs so that it can pass them to the hoarder 1050 when a hoard command is issued. It is further to be appreciated that the user agent 1010 may permit the user to specify a value of interestingness with each base URL. The "interestingness value" is a number between the range of 0 and 1 (inclusive) indicating how interesting the corresponding Web page is to the user, e.g., with 1 being the most interesting. If a user-specified interestingness is absent for a base URL, the user agent 1010 assumes a default value of 1.

The observer 1020, which will be discussed in greater detail herein with respect to FIG. 3, functions to intercept all data traffic related to the user's demand requests. The hoarder 1050, which will be discussed in greater detail herein with respect to FIG. 4, functions to examine the collection of base URLs that make up the hoard request and initiates the hoarding of individual Web pages. A hoarded page may be a base Web page or a page reachable from one of the base pages. The pages are hoarded in the descending order of user-perceived interestingness. As many pages are hoarded as possible, subject to certain resource limits. The resource limits may include, for example, the disk space used to store the pages or, the time spent on hoarding.

The proxy server 1030 functions as a relay system between the rest of the client system 1000 and the Web 1090. For example, proxy server 1030 accepts URLs from the observer 1020 and the hoarder 1050 and returns the corresponding Web pages retrieved from the Web 1090. It additionally maintains the cache storage 1040, which includes recently retrieved Web pages. The cache 1040 is likely to reside on a hard disk or, in addition, reside in main memory so that its contents may survive system restarts. The art of implementation of the proxy server 1030 and its cache 1040 is well known to those skilled in the art.

The content extractor 1060 functions to construct a feature vector (hereinafter "content feature vector") for characterizing the content of a Web page or a hyperlink. According to a preferred embodiment of the present invention, the content feature vector for a Web page is built from the entire text in the page, whereas the content feature vector for a hyperlink is built from text that appears in a window surrounding the anchor element in the embedding page (for example, the anchor element plus 50 words before and after the anchor element). One skilled in the art will recognize that there are other ways to construct a content feature vector for a Web page or for a hyperlink.

The attribute extractor 1070 constructs a feature vector (hereinafter "attribute feature vector") for characterizing the attributes of a Web page or a hyperlink. The attributes of a Web page refer to the location, type, and size etc. of the page. The attributes of a hyperlink refer to the attributes of the corresponding target page. According to a preferred embodiment of the present invention, the attribute feature vector includes features that correspond to all possible prefixes of the corresponding URL. For example, if a Web page (hyperlink) has a URL http://www.ibm.com/research/mobile/projects.html, then its attribute feature vector will contain the following features: http://www.ibm.com/, http://www.ibm.com/research/, http://www.ibm.com/research/mobile/, and http://www.ibm.com/research/mobile/projects.html. One skilled in the art will recognize that there are other ways of decomposing a URL to form features in the attribute feature vector, and that attribute features may also be extracted from sources such as the HTTP headers and the head element of an HTML document.

The interests profile 1080 retains for storage a user's interests. It comprises a content feature vector 1065 and an attribute feature vector 1075. The content feature vector characterizes the content of Web pages the user is likely to be interested in. The attribute feature vector characterizes the attributes of Web pages the user is likely to be interested in. FIG. 2(a) depicts a representation of an example content feature vector 1065 that includes feature words 1063 and their corresponding weights 1068. The right part of FIG. 2 is an example attribute feature vector 1075 including URL prefixes 1073 and their corresponding "interestingness" values or weights 1078.

Figure 3:
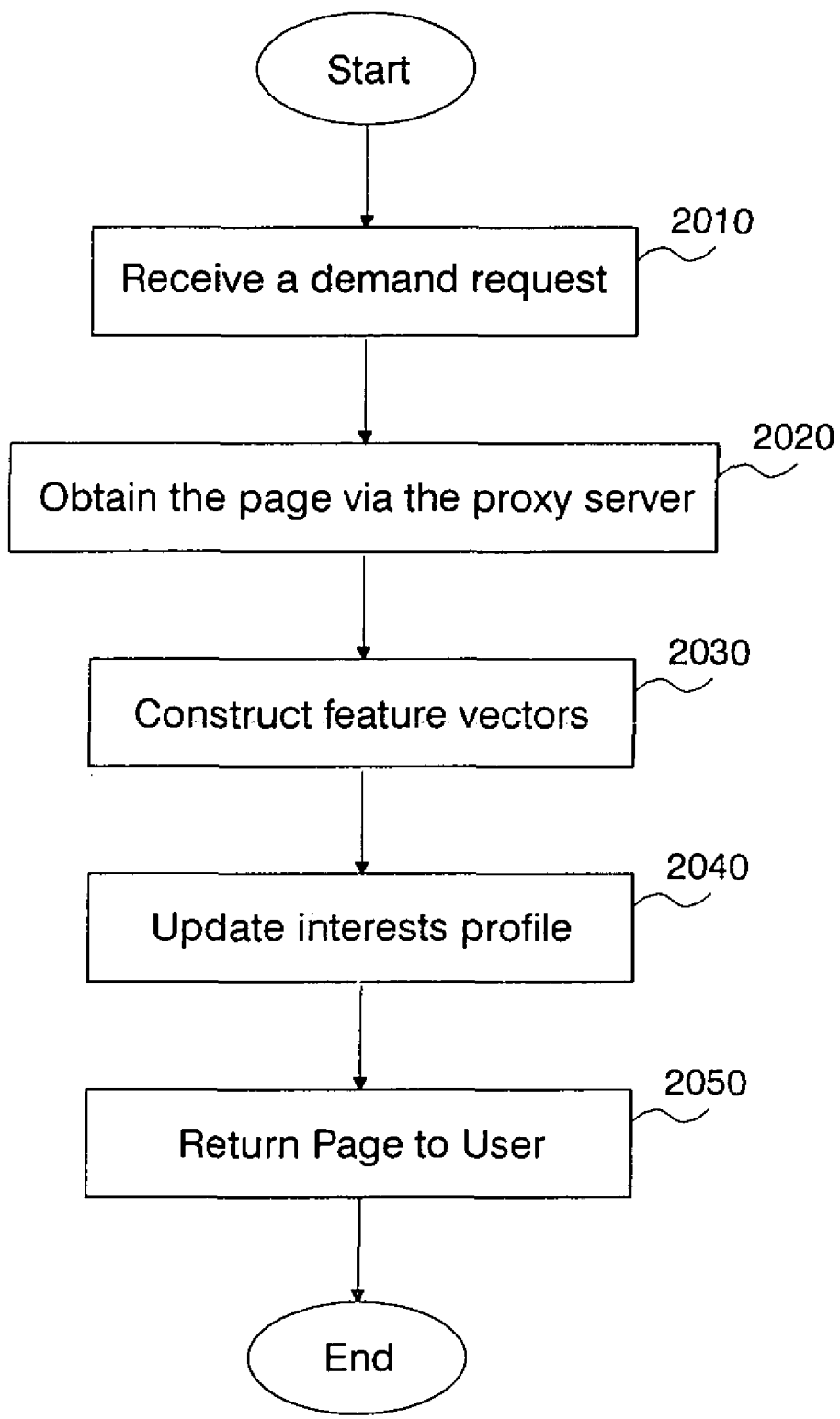
FIG. 3 is a logical flow diagram illustrating how a demand request is processed by the observer.

FIG. 3 illustrates the process by which the observer 1020 handles a demand request, in accordance with a preferred embodiment of the present invention. In a first step 2010, the observer receives from the user agent 1010 the URL of a Web page that is demanded. In step 2020, the observer obtains the Web page via the proxy server 1030. In step 2030, the observer constructs a content feature vector and an attribute feature vector for the Web page, particularly, by invoking the content extractor 1060 to construct the content feature vector and, invoking the attribute extractor 1070 to construct the attribute feature vector. In step 2040, the observer updates the interests profile 1080 with the two feature vectors built in step 2030. Preferably, the observer performs a sum of the content feature vector in the interests profile 1080 and the content feature vector for the Web page to generate the new content feature vector in the interests profile. It additionally performs a sum of the attribute feature vector in the interests profile 1080 and the attribute feature vector for the Web page to generate the new attribute feature vector in the interests profile. It is to be appreciated that the feature vectors may be aggregated in more sophisticated ways so that old interests may be forgotten over time. Finally, at step 2050, the Web page is returned to the user agent 1010.

In other embodiments within the scope of the invention, the interests profile 1080 generated by the observer 1020 may be complemented with, or replaced by, explicit specification by the user, possibly after the user specification is appropriately transformed. For example, the user specification may include a collection of key words identifying the user's interests in content, and the user's preferences on the attributes of Web pages such as document size, file type, and file location (server and directory). If the interests profile 1080 is to be completely based on user specification, then the observer component 1020 may be eliminated.

Figure 4:
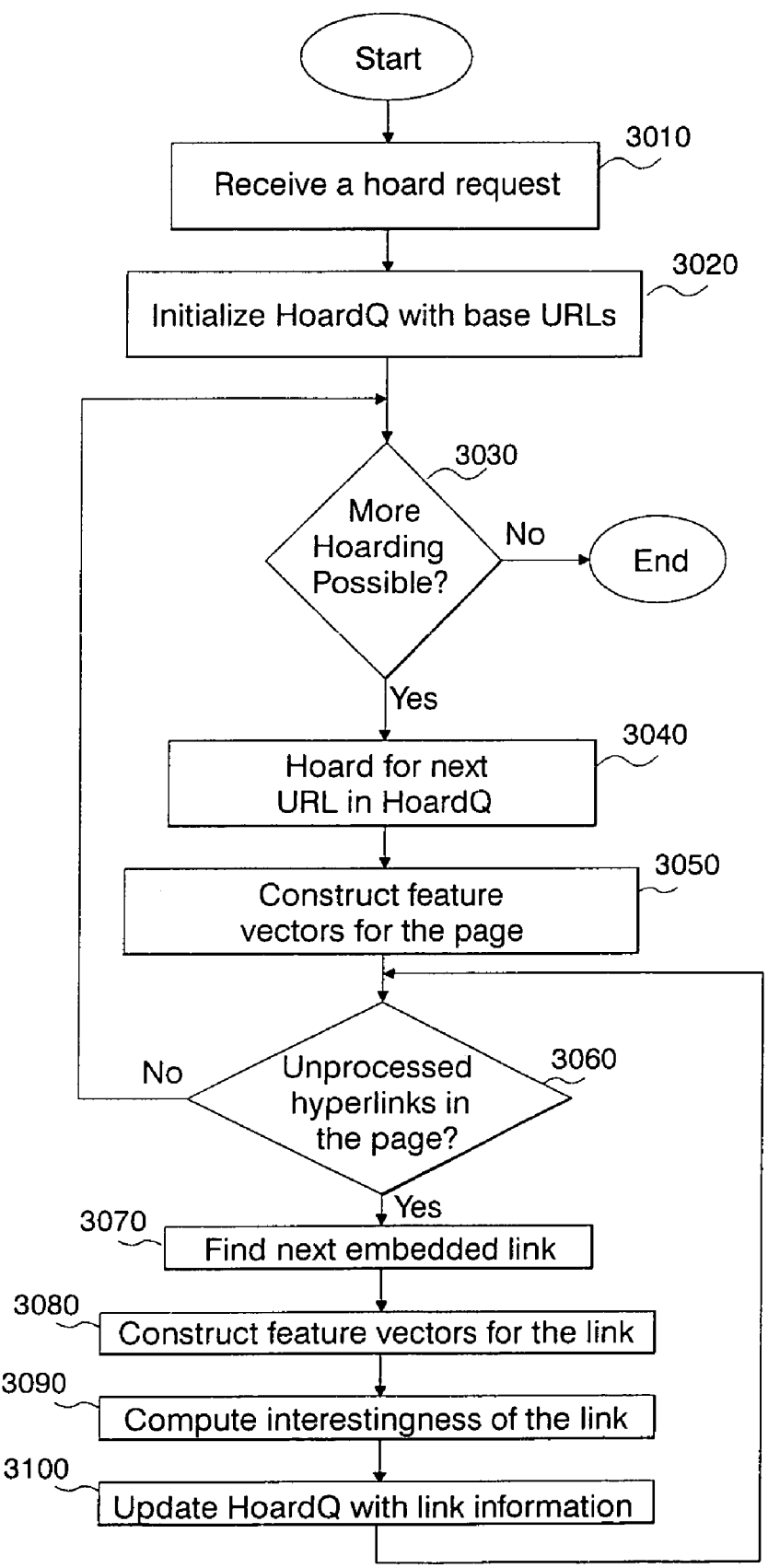
FIG. 4 is a logical flow diagram illustrating how a hoard request is processed by the hoarder.

FIG. 4 illustrates a preferred method of how a hoard request is serviced by the hoarder 1050, in accordance with the present invention. In step 3010, the hoarder receives a hoard request. The hoard request includes a collection of base URLs, each of which is associated with a value of interestingness. In step 3020, the hoarder creates a data structure, referred to as "HoardQ", for maintaining URLs that are hoard candidates together with their interestingness value. The hoarder initializes HoardQ with the base URLs and their interestingness. In step 3030, the hoarder makes a determination on whether it is possible to hoard more Web pages. Further hoarding is possible when there are entries in HoardQ and the resource limits have not been exceeded. If further hoarding is not possible, the process of servicing the current hoard request ends. If further hoarding is possible, the hoarder proceeds to step 3040 where the hoarder removes an entry in HoardQ that includes an unhoarded URL with the highest value of interestingness. The hoarder invokes the proxy server 1030 to fetch the corresponding Web page and its inline multimedia elements (pictures, animations, videos and sounds), in a manner generally known to those skilled in the art. This step effectively causes the Web page and its inline multimedia elements to be stored in the cache 1040 of the proxy server 1030 (FIG. 1), making them available to the user while offline. In step 3050, the hoarder constructs a content feature vector and an attribute feature vector for the newly hoarded page. The hoarder particularly invokes the content extractor 1060 to construct the content feature vector and, invokes the attribute extractor 1070 to construct the attribute feature vector. In steps 3060 to 3100, the hoarder iterates through all the hyperlinks embedded in the newly hoarded Web page. That is, at step 3070, the hoarder locates the next embedded hyperlink that has not been hoarded. In step 3080, the hoarder constructs a content feature vector and an attribute feature vector for the hyperlink particularly by invoking the content extractor 1060 to construct the content feature vector and, the attribute extractor 1070 to construct the attribute feature vector. In step 3090, the hoarder computes the interestingness of the hyperlink, which represents perceived interestingness of the corresponding target document, in a manner to be described in greater detail herein. In step 3100, the hoarder updates HoardQ with information about the current hyperlink. If an entry already exists in HoardQ for the hyperlink, the interestingness value is changed to the greater of the old interestingness value and the new interestingness value. If there is no entry in HoardQ for the link, an entry is created for the link and the interestingness value computed in step 3090 is provided. Thereafter, the process proceeds back to step 3060 where the process steps up to step 3100 are repeated for each of the hyperlinks embedded for that newly hoarded Web page.

In accordance with step 3090, in a preferred embodiment, the hoarder computes the interestingness value of the hyperlink, referred to as L, that is embedded in a Web page, referred to as P as follows: For ease of description, some additional notations are introduced: Let U denote the interests profile. Let X denote one of P and U. The similarity of L and X with respect to their content, denoted $S^C_{L,X}$, is preferably calculated as the similarity between the content feature vector of L and the content feature vector of X. The similarity of L and X with respect to their attributes, denoted $S^A_{L,X}$, is preferably calculated as the similarity between the attribute feature vector of L and the attribute feature vector of X. It is to be appreciated that a number of vector similarity metrics may be used for computing $S^C_{L,X}$ and $S^A_{L,X}$, for example, the cosine distance. It is to be understood that, since the interests profile U represent the user's accumulative interests, $S^C_{L,U}$ and $S^A_{L,U}$ should be computed in terms of only the features contained in the feature vectors of L. The overall similarity between L and X, denoted $S_{L,X}$, is preferably computed as a weighted sum $wS^C_{L,X}+(1-w)S^A_{L,X}$, where w is a configurable parameter in the range of 0 to 1. The perceived interestingness of the Web page P, denoted $I_P$, is input to the hoarder if P is one of the base pages, or preferably computed as the interestingness of the hyperlink via which P is reached. Finally, the interestingness of the hyperlink L, denoted $I_L$, is preferably computed as $I_P(vS_{L,P}+(I-v)S_{L,U})$, i.e., the multiplication of P's perceived interestingness and a weighted sum that combines the overall similarity between L and P and the overall similarity between L and U. The weighting factor "v" is another configurable parameter in the range of 0 and 1. It is to be appreciated that the computation of interestingness as described above guarantees that a target document always has a smaller perceived interestingness value than its source document and therefore will never be hoarded ahead of the latter.

The description of the present invention has been presented for purposes of illustration and description, and is not intended to be exhaustive or limited to the invention in the form disclosed. Many modifications, variations and extensions will be apparent to those of ordinary skill in the art. All such modifications, variations and extensions are intended to be included within the scope of the invention as defined by the appended claims.

Having thus described our invention, what we claim as new and desire to secure by Letters Patent is:

1. A method for supporting offline Web browsing at a client device comprising the steps of
   a) maintaining at said client device a user interests profile of that user's web-browsing behavior, said user interests profile including content preferences and attribute preferences of Web pages the user may be interested in, said attributes of Web pages including one or more of: file type, file size, file location information and their respective weights according to user's interest;
   b) receiving a hoard request for downloading one or more said Web pages;
   c) generating interestingness values of candidate Web pages based on said user's interests profile, said interestingness value accounting for content-based interestingness and attribute-based interestingness of said Web pages;
   d) selecting one or more candidate Web pages to hoard based on their respective interestingness values and downloading said selected Web pages; and,
   e) storing said Web pages for later viewing by said user when offline.

2. The method of claim 1, wherein said content preferences describe contents of a Web page that are of interest to a user, said content preferences being expressed in terms of relevant words and phrases and their respective weights.

3. The method of claim 1, wherein said attributes include said location information, and said location information includes the URL of that Web page and prefixes of the URL.

4. The method of claim 1, wherein said content preferences and said attribute preferences comprises one or more content vectors and attribute vectors, respectively, said step of maintaining a users interest profile includes constructing said content and attribute vectors.

5. The method of claim 4, wherein said step a) of maintaining a user interests profile comprises the steps of: monitoring a user's Web page browsing behavior, and dynamically updating said content and attribute vectors based on the Web pages browsed by that user.

6. The method of claim 1, further including enabling the user to directly access and modify that user's interests profile.

7. The method of claim 1, wherein the candidate Web pages include base Web pages which are supplied by the user in said hoard request, and linked Web pages which are reachable from the base pages.

8. The method of claim 1, wherein said interestingness values are supplied directly by the user.

9. The method of claim 1, wherein said interestingness values comprise default values.

10. The method of claim 7, wherein an interestingness value is computed as the interestingness of a hyperlink associated with a Web page reachable from a base Web page.

11. The method of claim 10, further including computing an interestingness value of a hyperlink leading to said reachable Web page according to steps of:
   f) calculating one of: a similarity of a linked Web page to its base Web page and obtaining a first similarity measure, or a similarity of a linked Web page to the user's interests profile and obtaining a second similarity measure, or calculating both, said calculating of a linked Web page's similarity including accounting for similarity of content and attributes;
   g) utilizing either of said first and second similarity measures or, combining said first and second similarity measures to obtain a similarity result; and,
   h) combining the similarity result with the interestingness value of the base Web page.

12. The method of claim 11, further including the step of determining the content information of a linked Web page.

13. The method of claim 12, wherein said content information is based on the text surrounding the hyperlink in the base Web page.

14. A system for supporting offline Web browsing at a client device, comprising:
   means for maintaining a user interests profile at said client device, said user interests profile including content preferences and attribute preferences of Web pages that a user may be interested in, said attributes of Web pages including one or more of: file type, file size, file location information and their respective weights according to user's interest;
   means for receiving a user hoard request for downloading one or more Web pages and generating interestingness values associated with candidate Web pages based on that user's interests profile, said interestingness values accounting for content-based interestingness and attribute-based interestingness of said Web pages;
   means in communication with the World Wide Web for downloading of one or more Web pages based on their respective interestingness values;
   a storage device for temporarily storing downloaded one or more said Web pages; and,
   interface device for enabling subsequent viewing of said one or more downloaded Web pages while that user is disconnected from said Web.

15. The system for supporting offline Web browsing as claimed in claim 14, further including means for extracting attributes and content preferences associated with viewed user Web pages, wherein said content preferences are expressed in terms of relevant words and phrases and their respective weights according to user's interest.

16. The system for supporting offline Web browsing as claimed in claim 14, wherein the candidate Web pages include initial Web pages which are supplied by the user in said hoard request and linked Web pages which are reachable from the base pages.

17. The system for supporting offline Web browsing as claimed in claim 14, wherein said means in communication with the World Wide Web includes a proxy server device for downloading of one or more Web pages while connected to the Web and storing said downloaded Web pages in said storage device.

18. The system for supporting offline Web browsing as claimed in claim 17, wherein candidate Web pages include base Web pages which are supplied by the user in said hoard request, and linked Web pages which are reachable from the base pages, said system further including means for computing an interestingness value of a hyperlink associated with a Web page reachable from a base Web page.

19. The system for supporting offline Web browsing as claimed in claim 18, wherein said means for computing an interestingness vale of a hyperlink leading to said reachable Web page comprises:
   means for calculating one of: a similarity of a linked Web page to its base Web page and obtaining a first similarity measure, or a similarity of a linked Web page to the user's interests profile and obtaining a second similarity measure, or calculating both, said calculating of a linked Web page's similarity including accounting for similarity of content and attributes;
   means for utilizing either of said first and second similarity measures or, combining said first and second similarity measures to obtain a similarity result; and,
   means for combining the similarity result with the interestingness value of the base Web page.

20. A program storage device readable by machine, tangibly embodying a program of instructions executable by the machine to perform method steps for supporting offline Web browsing at a client device, the method steps comprising:
   a) maintaining at said client device, a user interests profile of that user's web-browsing behavior, said user interests profile including content preferences and attribute preferences of Web pages the user may be interested in, said attributes of Web pages including one or more of file type, file size, file location information and their respective weights according to user's interest;
   b) receiving a hoard request for downloading one or more said Web pages;
   c) generating interestingness values of candidate Web pages based on said user's interests profile, said interestingness value accounting for content-based interestingness and attribute-based interestingness of said Web pages;
   d) selecting one or more candidate Web pages to hoard based on their respective interestingness values and downloading said selected Web pages; and,
   e) storing said Web pages for later viewing by said user when offline.

21. The program storage device readable by machine according to claim 20, wherein the content preferences describe contents of a Web page that are of interest to a user, said content preferences being expressed in terms of relevant words and phrases and their respective weights.

22. The program storage device readable by machine according to claim 20, wherein the attributes include the location information, and the location information includes the URL of that Web page and prefixes of the URL.

23. The program storage device readable by machine according to claim 20, wherein said content preferences and attribute preferences comprises one or more content vectors and attribute vectors, respectively, said step a) of maintaining a user interests profile includes constructing said content and attribute vectors.

24. The program storage device readable by machine according to claim 23, wherein said step a) of maintaining a user interests profile comprises the steps of: monitoring a user's Web page browsing behavior, and dynamically updating said content and attribute vectors based on the Web pages browsed by that user.

25. The program storage device readable by machine according to claim 20, further including the method step of enabling the user to directly access and modify that user's interests profile.

26. The program storage device readable by machine according to claim 20, wherein the candidate Web pages include base Web pages which are supplied by the user in said hoard request, and linked Web pages which are reachable from the base pages.

27. The program storage device readable by machine according to claim 20, wherein said interestingness values are supplied directly by the user.

28. The program storage device readable by machine according to claim 26, wherein an interestingness value is computed as the interestingness of a hyperlink associated with a Web page reachable from a base Web page.

29. The program storage device readable by machine according to claim 28, wherein the method steps further include computing an interestingness value of a hyperlink leading to said reachable Web page according to steps of f) calculating one of: a similarity of a linked Web page to its base Web page and obtaining a first similarity measure, or a similarity of a linked Web page to the user's interests profile and obtaining a second similarity measure, or calculating both, said calculating of a linked Web page's similarity including accounting for similarity of content and attributes;

g) utilizing either of said first and second similarity measures or, combining said first and second similarity measures to obtain a similarity result; and, h) combining the similarity result with the interestingness value of the base Web page.

30. The program storage device readable by machine according to claim 29, further including the step of determining the content information of a linked Web page.

31. The program storage device readable by machine according to claim 30, wherein said content information is based on the text surrounding the hyperlink in the base Web page.

* * * * *